(12) United States Patent
Endo (10) Patent No.: US 7,002,280 B2
(45) Date of Patent: Feb. 21, 2006

(54) CLAW-POLE DYNAMO WITH RADIALLY OFFSET YOKE ARMS

(75) Inventor: Takahiro Endo, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/434,628

(22) Filed: May 8, 2003

(65) Prior Publication Data
US 2004/0007938 A1  Jan. 15, 2004

(30) Foreign Application Priority Data
May 9, 2002  (JP) .............................. 2002-134411

(51) Int. Cl.
  H02K 21/12  (2006.01)
  H02K 21/22  (2006.01)
  H02K 1/14   (2006.01)
(52) U.S. Cl. ...................... 310/263; 310/216; 310/218
(58) Field of Classification Search ............. 310/75 C, 310/257, 263, 216, 217, 194, 67 A, 218
See application file for complete search history.

(56) References Cited

U.S. PATENT DOCUMENTS

| | | | |
|---|---|---|---|
| 1,450,521 A | | 4/1923 | Steinbach |
| 2,196,682 A | | 4/1940 | Nowosielski |
| 2,243,318 A | * | 5/1941 | Rawlings ..................... 310/263 |
| 2,487,180 A | * | 11/1949 | Rawlings ..................... 310/254 |
| 3,842,300 A | * | 10/1974 | Daykin et al. ............... 310/216 |
| 3,944,863 A | | 3/1976 | Apsit et al. |
| 5,122,705 A | | 6/1992 | Kusase et al. |
| 5,828,145 A | * | 10/1998 | Nakamura ................. 310/67 A |
| 6,060,810 A | * | 5/2000 | Lee et al. .................... 310/254 |
| 6,133,669 A | * | 10/2000 | Tupper ........................ 310/263 |
| 6,194,806 B1 | * | 2/2001 | Suzuki et al. ............... 310/269 |
| 6,239,532 B1 | * | 5/2001 | Hollenbeck et al. ........ 310/257 |
| 6,455,976 B1 | * | 9/2002 | Nakano ...................... 310/254 |
| 6,605,884 B1 | * | 8/2003 | Nishimoto ................ 310/67 A |
| 2002/0135264 A1 | * | 9/2002 | Song et al. ................. 310/254 |

FOREIGN PATENT DOCUMENTS

| | | |
|---|---|---|
| DE | 196 01 542 A1 | 7/1996 |
| DE | 195 29 800 A1 | 2/1997 |
| DE | 298 06 210 U1 | 10/1998 |
| EP | 591724 A1 | 4/1994 |
| EP | 982834 A1 | 3/2000 |
| EP | 1155948 A2 | 11/2001 |
| JP | 2001-37108 A | 2/2001 |
| WO | WO 99/34497 | 7/1999 |

OTHER PUBLICATIONS

Patent Abstracts of Japan, vol. 1996, No. 03; Mar. 29, 1996, for JP 7-291166.
Patent Abstracts of Japan, vol. 2000, No. 19; Jun. 5, 2001, for JP 2001-037108.

* cited by examiner

Primary Examiner—Tran Nguyen
(74) Attorney, Agent, or Firm—James A. Deland (57) ABSTRACT

A claw-pole dynamo comprises a permanent magnet, a coil, and a yoke surrounding the coil. The yoke comprises a plurality of first yoke arms disposed on a first axial side of the coil and a plurality of second yoke arms disposed on a second axial side of the coil. Each yoke arm has a radially outer portion and a radially inner portion, and each yoke arm comprises a plurality of plate-shaped pieces. The radially outer portions of the yoke arms extend axially toward corresponding opposite sides of the coil. Each yoke arm radially inner portion faces a corresponding yoke arm radially inner portion disposed on the opposite side of the coil in the axial direction, and the plurality of first yoke arm radially outer portions are interleaved with the plurality of second yoke arm radially outer portions in a circumferential direction.

21 Claims, 10 Drawing Sheets

NON-LOAD ROTATIONAL TORQUE CHARACTERISTIC

| SPEED [km/h] | PRESSED SOFT MAGNETIC IRON | SILICON STEEL PLATE LAYER | RATE OF DECREASE (%) |
|---|---|---|---|
| 5 | 0.92 | 0.8 | 13.0 |
| 10 | 1.2 | 0.85 | 29.2 |
| 15 | 1.46 | 0.89 | 39.0 |
| 20 | 1.69 | 0.91 | 46.2 |
| 30 | 2.03 | 1 | 50.7 |
| 60 | 2.72 | 1.32 | 51.5 |

CLAW-POLE DYNAMO WITH RADIALLY OFFSET YOKE ARMS

BACKGROUND OF THE INVENTION

The present invention is directed to bicycles and, more particularly, to a claw-pole dynamo having a yoke that is formed by plate-shaped members.

Due to configuration and cost considerations, the yoke of a conventional claw-pole dynamo is often formed using pressed sheet metal. However, this type of conventional dynamo has the problem of decreased efficiency due to the generation of eddy current. Accordingly, as disclosed in Japanese Patent Laid-Open No. 2001-37108, a dynamo has a coil fixed to a hub shaft and a casing that can rotate relative to the hub shaft. The casing has a magnet on its inner circumferential surface so that the magnet rotates with the casing. The yoke that houses the dynamo coil comprises multiple laminated thin plate-shaped members to prevent the generation of eddy currents. It is know that in this type of generator, the generation of eddy current decreases in inverse proportion to the square of the plate thickness of the yoke. By forming the yoke using laminated plate-shaped pieces, the thickness can be reduced and the generation of eddy currents can be minimized. However, in the case of a claw-pole dynamo, because the radially outer portions of the yoke extend toward each other in a circumferentially interleaved manner from the axial ends of the dynamo, it is difficult to design an efficient laminated construction. Furthermore, other magnetic members must be placed at the interleaved portion. When such other magnetic members are used, however, magnetic resistance increases and efficiency decreases. Furthermore, such additional magnetic members increase manufacturing costs and the cost of the resulting dynamo.

SUMMARY OF THE INVENTION

The present invention is directed to various features of a claw pole dynamo. In one embodiment, a claw-pole dynamo comprises a permanent magnet, a coil, and a yoke surrounding the coil. The yoke comprises a plurality of first yoke arms disposed on a first axial side of the coil and a plurality of second yoke arms disposed on a second axial side of the coil. Each yoke arm has a radially outer portion and a radially inner portion, and each yoke arm comprises a plurality of plate-shaped pieces. The radially outer portions of the yoke arms extend axially toward corresponding opposite sides of the coil. Each yoke arm radially inner portion faces a corresponding yoke arm radially inner portion disposed on the opposite side of the coil in the axial direction, and the plurality of first yoke arm radially outer portions are interleaved with the plurality of second yoke arm radially outer portions in a circumferential direction.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
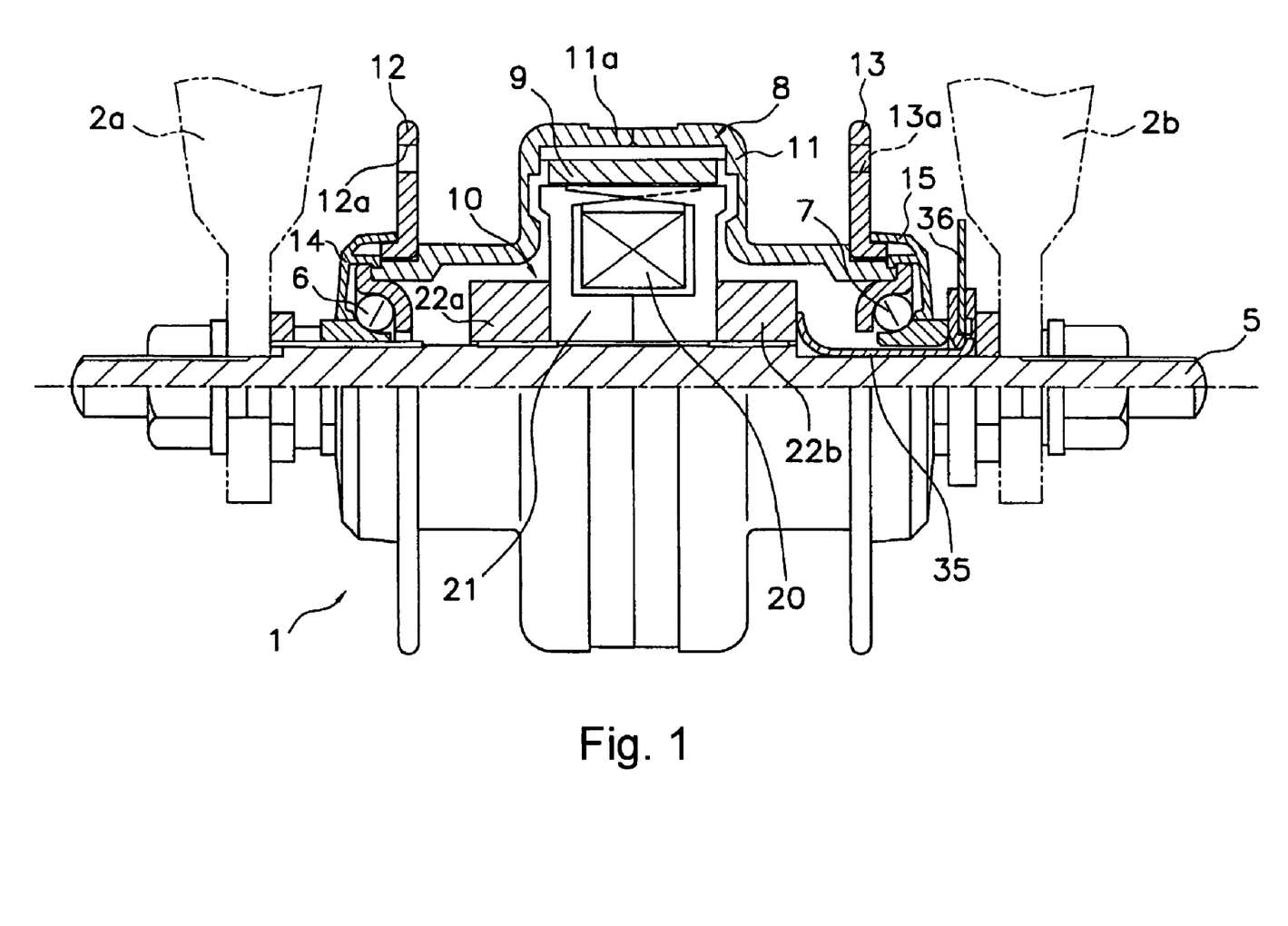
FIG. 1 is a partial cross-sectional view of a particular embodiment of a hub dynamo.
Figure 2:
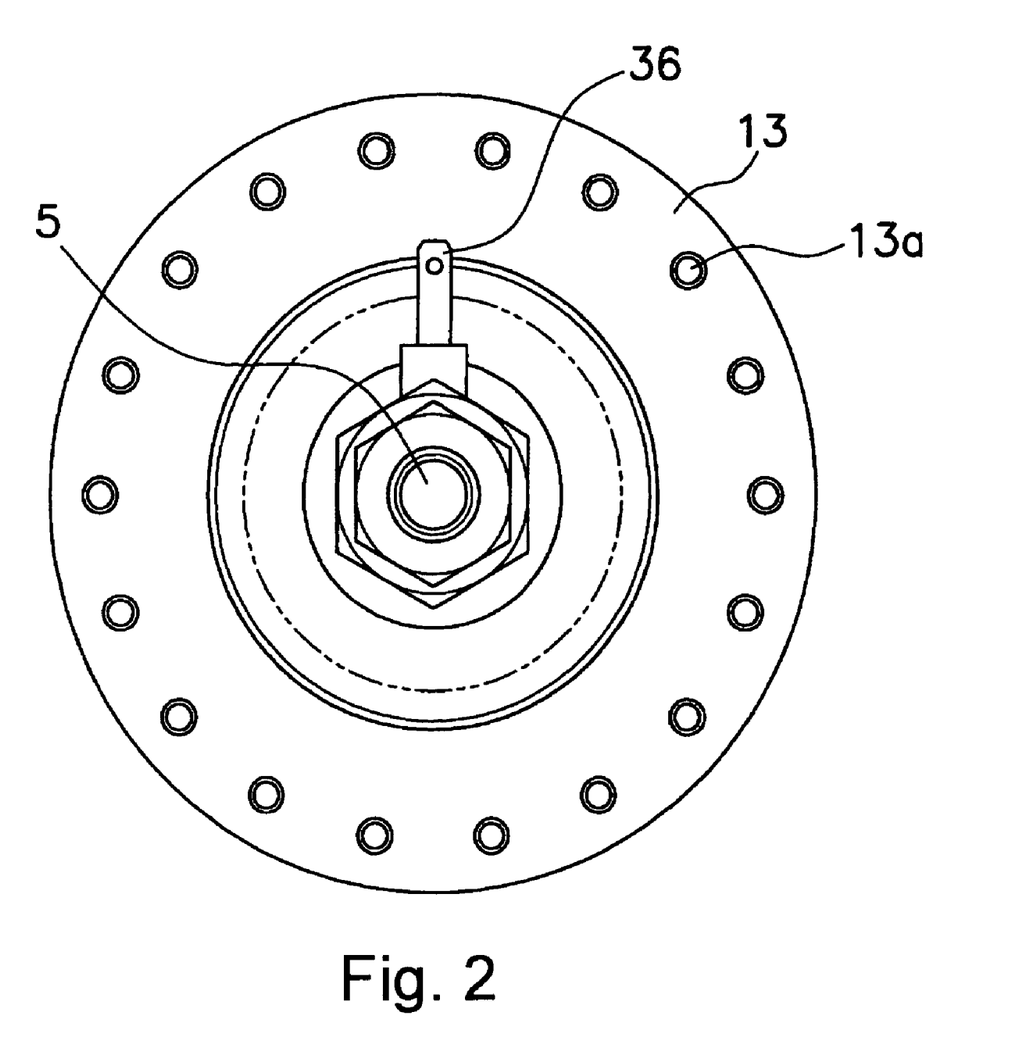
FIG. 2 is a side view of the hub dynamo.

FIG. 1 is a partial cross-sectional view of a particular embodiment of a hub dynamo 1, and FIG. 2 is a side view of hub dynamo 1. As shown in FIG. 1, hub dynamo 1 is mounted to distal ends of right and left front forks 2a and 2b of a front wheel of a bicycle (not shown). The hub dynamo 1 includes a hub shaft 5, both end portions of which are fixed to the front forks 2a and 2b, a casing 8 that is supported on the hub shaft 5 by a pair of bearings 6 and 7, a permanent magnet 9, and an interior fixed unit 10 that is fixed to the hub shaft 9.

Casing 8 has a case main unit 11 and a pair of hub flanges 12 and 13. The case main unit 11 is a cylindrical member formed such that it extends along the axis of the hub shaft 5, and it has a protrusion 11a in the axial center that protrudes away from the outer circumference of the hub shaft 5. The pair of hub flanges 12 and 13 are secured to the outer circumferential surface of each axial end portion of the case main unit 11, and multiple mounting holes 12a and 13a for mounting the inner ends of the wheel spokes (not shown) are formed at equal intervals along the circumferences of the respective hub flanges 12 and 13. In addition, seal members 14 and 15 are disposed between the casing 8 and the bearings 6 and 7 at the axial ends of the casing 8 in order to prevent the entry of dirt, dust, moisture or other foreign matter into the casing 8.

The permanent magnet 9 is secured to the inner surface of the protrusion 11a of the casing 8, wherein permanent magnet 9 comprises four individual magnets that are spaced at equal intervals along the circumferential direction. The permanent magnet 9 is magnetized with alternating N and S poles disposed at equal intervals, and each individual magnet faces the yoke radially outer portions described below.

The interior fixed unit 10 has a ring-shaped coil 20 and a yoke 21 that is disposed such that it surrounds the coil 20. The coil 20 and the yoke 21 are secured to the hub shaft 5 such that they are sandwiched by a pair of nuts 22a and 22b that are fastened to screw members formed on the outer circumferential surface of the hub shaft 5. Coil 20 and yoke 21 are positioned along the axial direction such that they are housed inside the protrusion 11a.

Figure 3A:
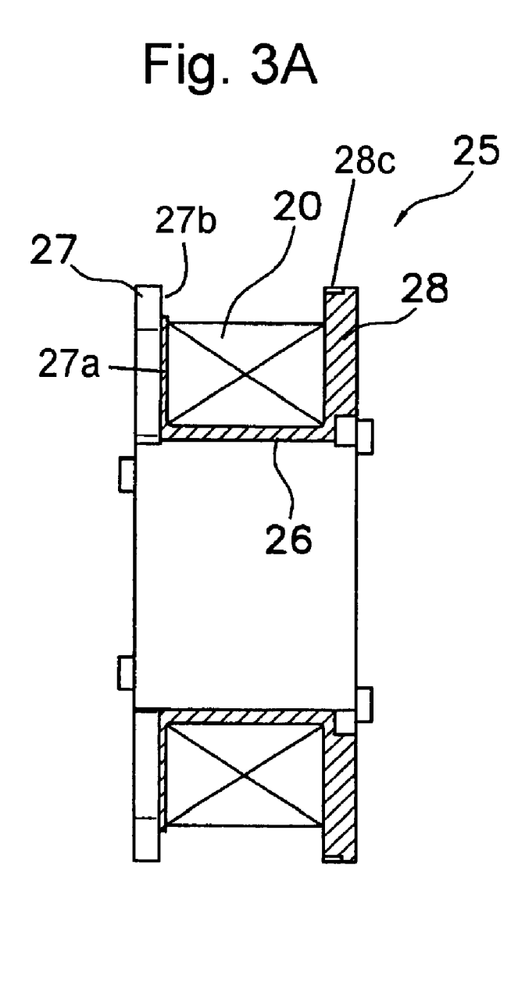
FIG. 3(A) is a cross-sectional view of a particular embodiment of a bobbin used in the hub dynamo.
Figure 3B:
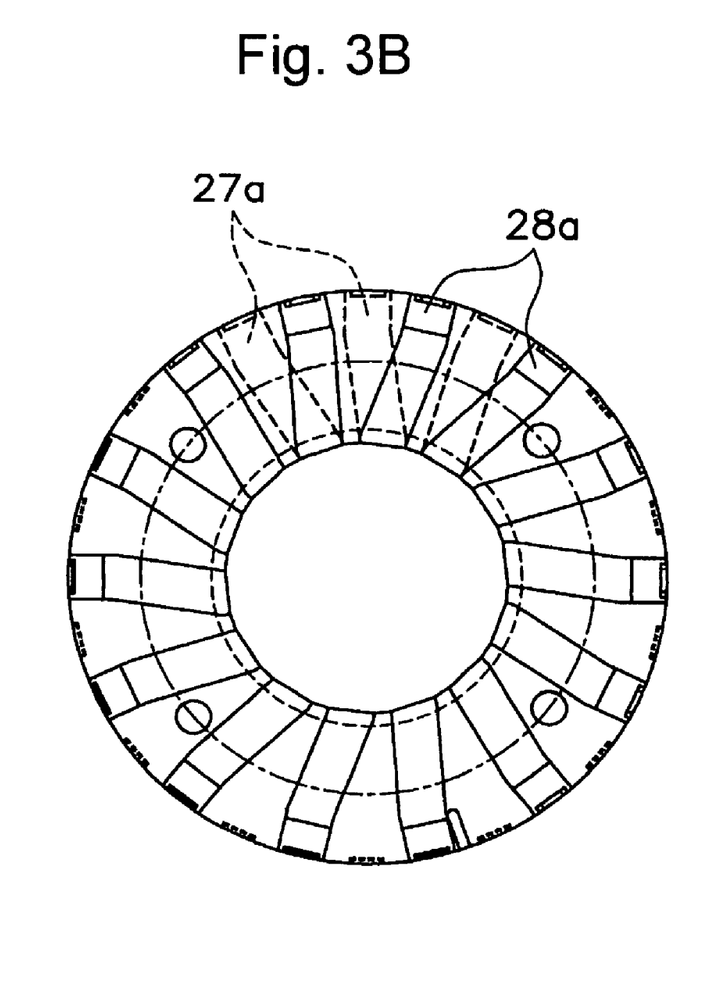
FIG. 3(B) is a side view of the bobbin.
Figure 4A:
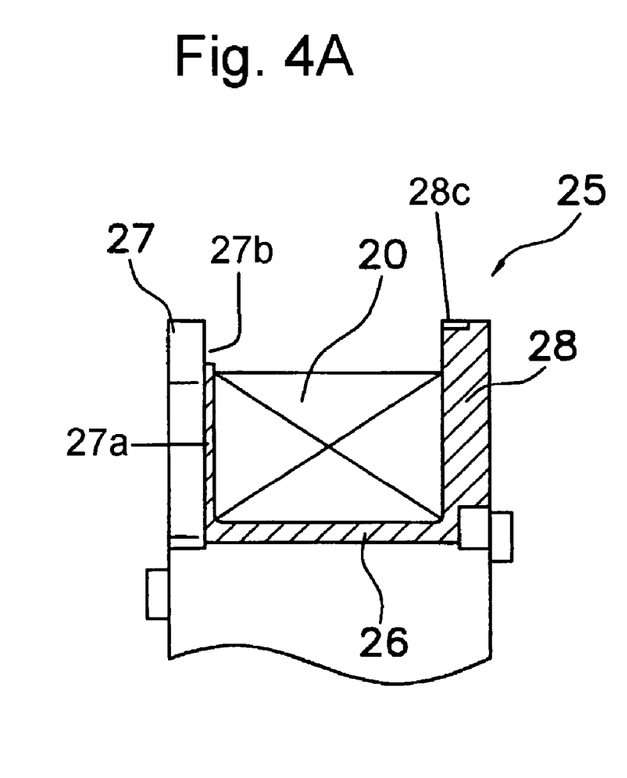
FIG. 4(A) is an enlarged cross-sectional view of a portion of the bobbin.
Figure 4B:
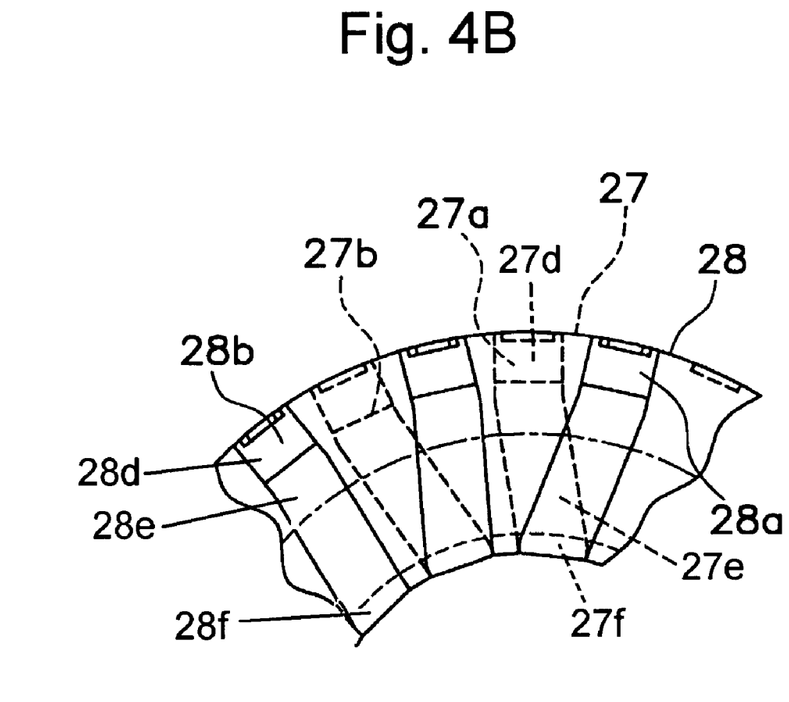
FIG. 4(B) is an enlarged side view of a portion of the bobbin.
Figure 5:
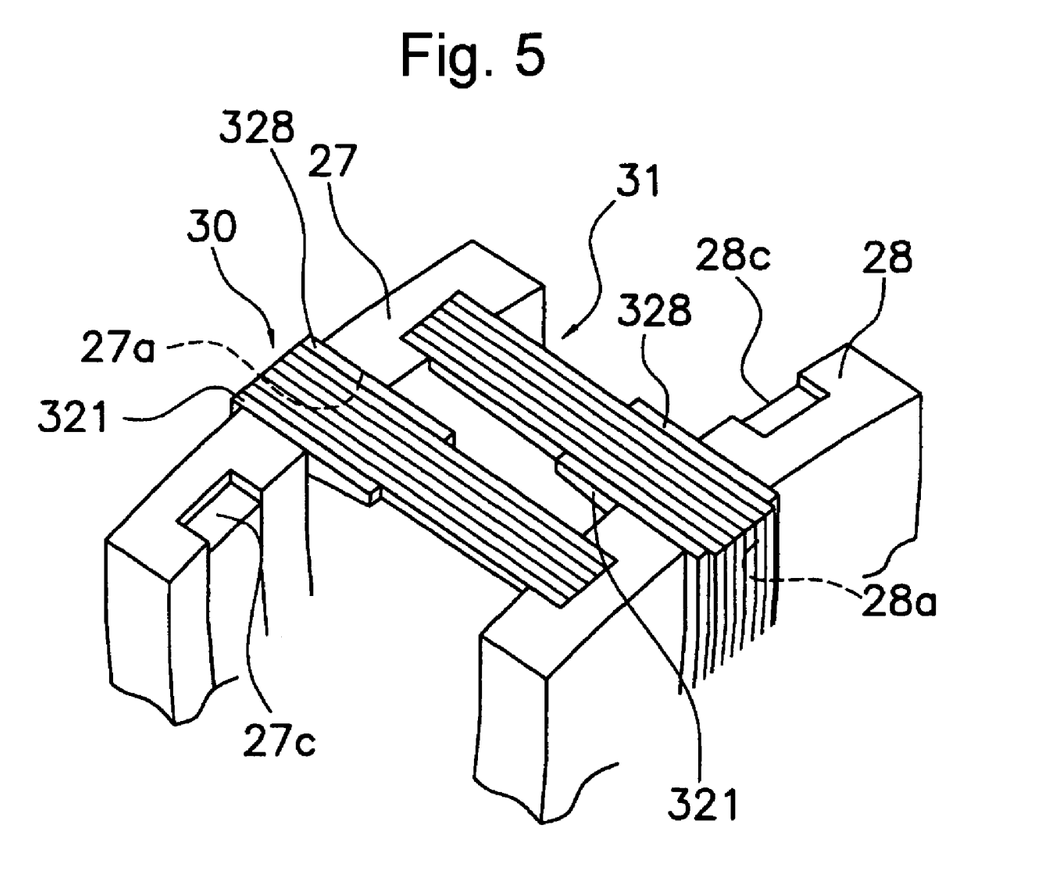
FIG. 5 is a perspective partial view of a particular embodiment of yoke arms installed in the bobbin.

Coil 20 is wound around a bobbin 25 as shown in FIGS. 3(A) and 4(A). Bobbin 25 has a tubular barrel 26, a first flange 27, and a second flange 28. First flange 27 and second flange 27 are formed at opposite axial ends of barrel 26, and coil 20 is wound around tubular barrel 26. As shown in FIGS. 3(A)–3(B), 4(A)–4(B), grooves 27a and 28a are formed on the side surfaces of the first and second flanges 27 and 28, respectively, wherein grooves 27a and 28a extend in essentially a radial direction. These grooves 27a and 28a are formed such that, when viewed along the axial direction: (i) radially outer portions 27d and 28d of grooves 27a and 28a, respectively, are offset relative to each other, i.e., a radially outer portion 28d of a groove 28a of the second flange 28 is positioned between adjacent two radially outer portions 27d of grooves 27a of the first flange 27, (ii) the radially intermediate portions 27e and 28e of grooves 27a and 28a, respectively, partially overlap each other, and (iii), the radially inner portions 27f and 28f of grooves 27a and 28a, respectively, overlap virtually completely with each other. The radially outer portion 27d and 28d of each groove 27a and 28a is cut out to form a notch 27b or 28b, respectively. Furthermore, as shown in FIGS. 3(A), 4(A) and 5, a plurality of indentations 27c and 28c that have a prescribed length and run from the interior side toward the exterior side along the axial direction are formed in the parts of the outer circumferential surfaces of the flanges 27 and 28 in which no groove 27a or 28a is formed. In FIG. 5, some of the yoke arms are omitted in order to facilitate the description.

Figure 6:
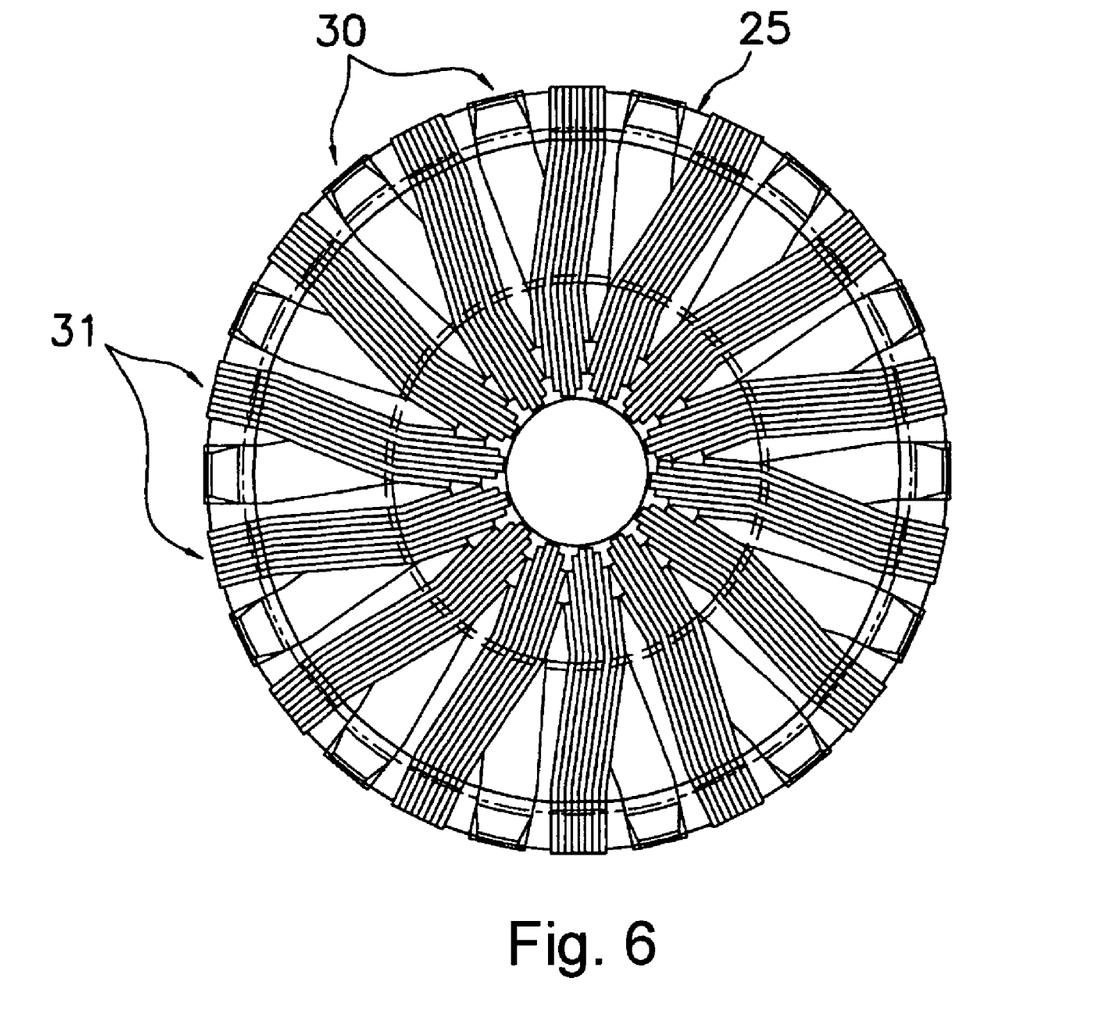
FIG. 6 a side view of the yoke arms installed in the bobbin.

FIGS. 5 and 6 shows portions of the yoke 21 mounted to the bobbin 25. As shown therein, the yoke 21 comprises a plurality of first laminated yoke arms 30 and a plurality of second laminated yoke arms 31. Yoke arms 30 are mounted such that they engage with the grooves 27a of the first flange 27 of the bobbin 25, and yoke arms 31 are mounted such that they engage with the grooves 28a of the second flange 28 of the bobbin 25.

Figure 7:
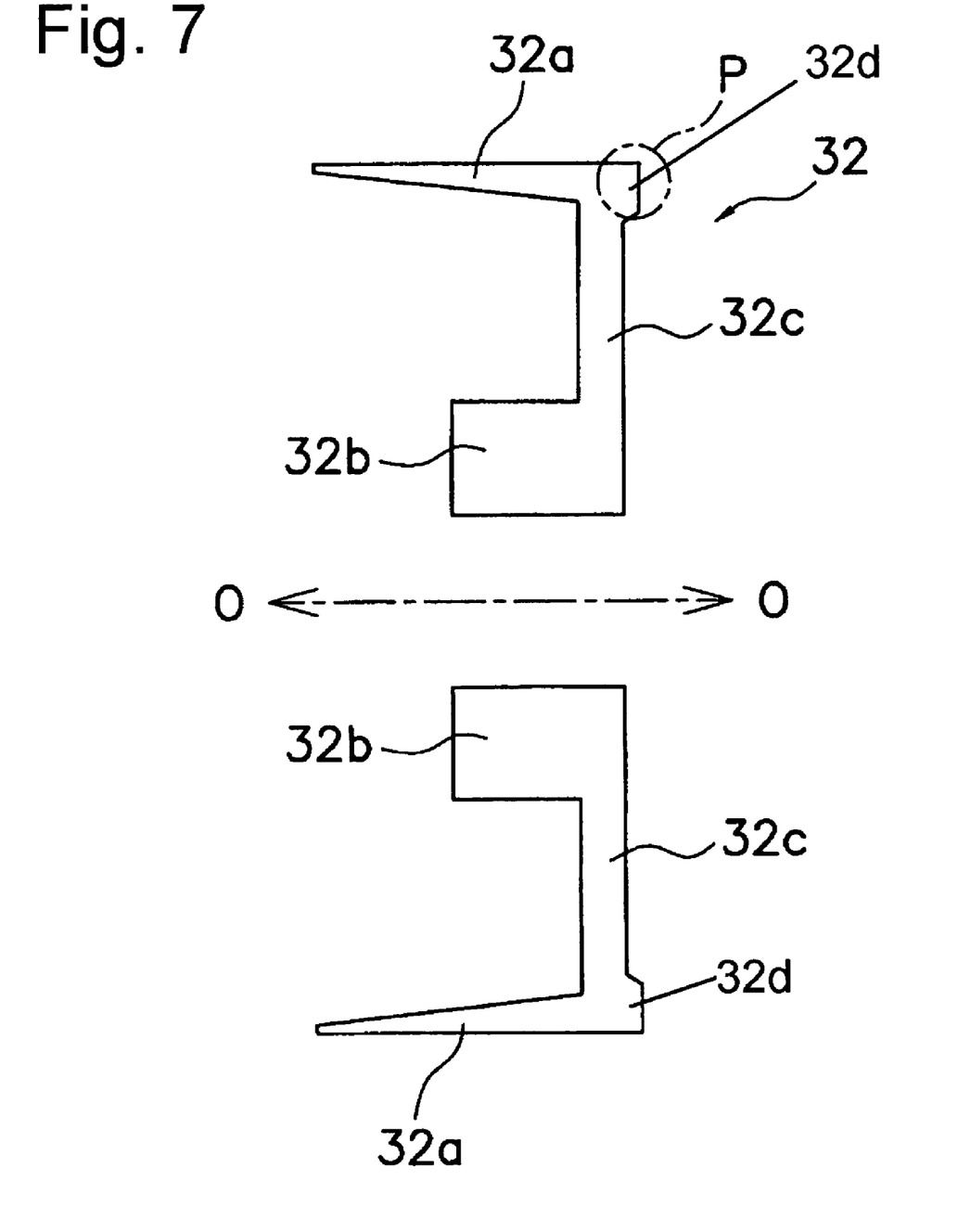
FIG. 7 is a front view of a particular embodiment of laminated plates used in the yokes.
Figure 8:
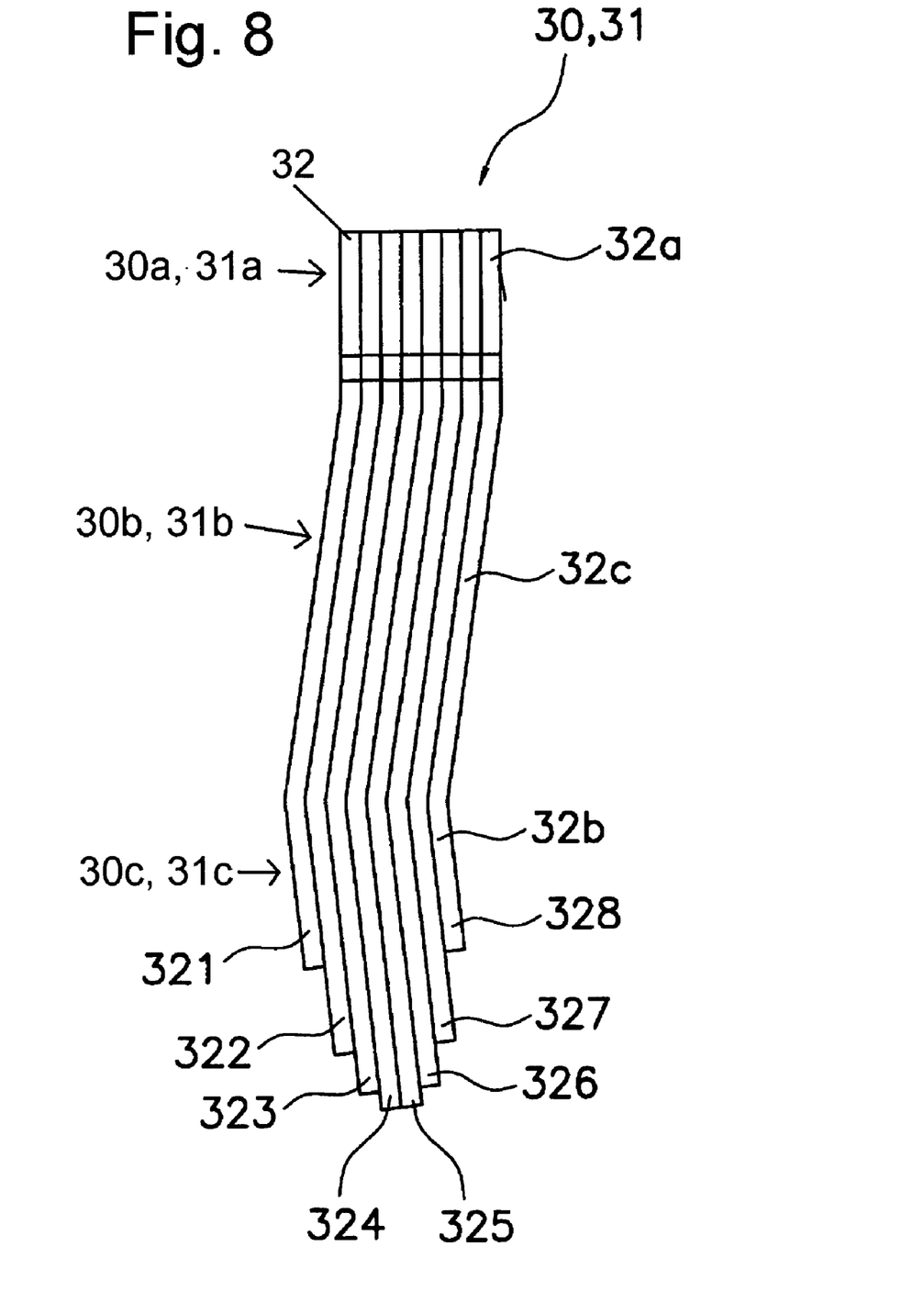
FIG. 8 is a side view of a particular embodiment of a yoke formed by a plurality of the laminated plates.

In this embodiment, each laminated yoke arm 30 and 31 is formed via lamination of a plurality of laminated plate-shaped pieces 32, as shown in FIGS. 6–8. Each plate-shaped piece 32 is formed from a silicon steel plate (more precisely, a non-directional silicon steel plate) on the surface of which an oxide coating is formed. Each plate-shaped piece 32 has essentially the same configuration wherein, as shown in FIG. 7, each plate-shaped piece has a radially outer portion 32a, a radially inner portion 32b, a linking (intermediate) portion 32c, and a notch engaging portion 32d. Consequently, each yoke arm 30 and 31 has respective yoke arm radially outer portion 30a and 31a, yoke arm radially inner portions 30b and 31b, and yoke arm linking (intermediate) portion 30c and 31c.

The linking portions 32c of the plate-shaped pieces 32 engage with the radially intermediate portions 27e, 28e of grooves 27a and 28a, respectively, formed in the flanges 27 and 28 of the bobbin 25. The radially outer portion 32a extends along the axis of the hub shaft 5 (i.e., along the O—O line in FIG. 7) from one end of the linking portion 32c (its proximal portion) and tapers toward its distal end. The radially inner portion 32b similarly extends from the other end of the linking portion 32c along the axis of the hub shaft 5. As shown in FIG. 8, these plate-shaped pieces 32 are formed such that the radially outer portion 32a and the radially inner portion 32b are positioned on different radial lines when viewed along the axial direction.

In this embodiment, the notch engaging portion 32d formed at the proximal end of each plate-shaped piece 32 engages with and is held in the notches 27b and 28b formed with the grooves 28a and 28b, respectively, of the flanges 27 and 28, and the distal end of the radially outer portion 32a of each plate-shaped piece 32 engages with and is held in the indentation 27c or 28c formed in the side of the flange 27 or 28 that is disposed on the opposite side of the bobbin 25. The notches 27b and 28b and/or the indentations 27c and 28c thus allow the plate-shaped pieces 32, and hence the yokes 27 and 28, to be reliably secured in the circumferential direction.

Each plate-shaped piece 32 has a thickness ranging from 0.25 mm to 1 mm, and a thickness of 0.5 mm is preferred from the standpoint of cost and performance. In this embodiment, each laminated yoke arm 30 and 31 is formed through the lamination of eight plate-shaped pieces 32. The lengths of the various plate-shaped pieces 32 differ. As shown in FIG. 8, the outermost pair of plate-shaped pieces 321 and 328 are the shortest radially, the next outermost pair of plate-shaped pieces 322 and 327 are next shortest radially, the next outermost plate-shaped pieces 323 and 326 are next shortest radially, and the innermost pair of plate-shaped pieces 324 and 325 are longest radially. Forming the various plate-shaped pieces with these lengths enables a more efficient construction, wherein the radially inner portions of adjacent laminated yoke arms along the circumferential direction do not touch each other and the cross-sectional areas of the magnetic paths are largest.

Furthermore, as shown in FIG. 5, the outermost plate-shaped pieces 321 and 328 of each yoke arm 30 and 31 along the circumferential direction are formed such that their radially outer portions 32a have a length in the axial direction that is approximately half that of the other plate-shaped pieces. This is intended to prevent the plate-shaped pieces 321 and 328 that are adjacent to each other along the circumferential direction from touching each other, and to minimize the leakage of magnetic flux therebetween.

Finally, as shown in FIG. 7, each plate-shaped piece 32 is formed such that the outside part of the area that connects the radially outer portion 32a and the linking portion 32c (the area P in FIG. 7) is not formed in an arc configuration, but rather in an acute angle configuration. Therefore, the distance to the permanent magnet 9 is reduced with regard to this area as well, thereby increasing magnetic flux in comparison with a yoke formed via conventional sheet metal pressing.

As shown in FIG. 1, the radially inner portions 32b of the plate-shaped pieces 32 forming the first and second laminated yoke arms 30 and 31 are positioned on the radially inner circumferential side of the coil 20, and the radially outer portions 32a of the plate-shaped pieces 32 are positioned between the coil 20 and the permanent magnet 9. Furthermore, as is clear from FIGS. 1 and 6, the radially inner portions 32b of the plate-shaped pieces 32 forming the first yoke arms 30 and the second yoke arms 31 are in direct magnetic contact. As a result, the cross-sectional area of the magnetic path through which the magnetic flux passes between the two sets of laminated yoke arms 30 and 31 can be maintained at an adequate level and magnetic saturation can be avoided. Therefore, members comprising other magnetic material are not necessary in order to connect the first yoke arms 30 and the second yoke arms 31, and the amount of resistance can be kept extremely small so that efficiency can be improved.

As shown in FIG. 1, a connecting piece 35 that is used to extract generated power to the outside is disposed on the nut 22b used to secure the coil 20 and the yoke 21, and extends along the hub shaft 5. One end of this connecting piece 35 is in contact with the side surface of the nut 22b, while the other end passes under the inner circumference of the bearing 7 and is pulled outside the casing 8, where it is connected to an extraction terminal 36 located outside the casing 8.

The generation of power carried out by the hub dynamo 1 will now be explained. When the front wheel, i.e., the casing 8, rotates relative to the hub shaft 5 as the bicycle travels forward, the permanent magnet 9 rotates relative to the interior fixed unit 10 fixed to the hub shaft 5. Thus, the permanent magnet 9 rotates around the coil 20 and the radially outer portions 32a of the plate-shaped pieces 32 forming yoke 21. When the radially outer portions 32a of the plate-shaped pieces 32 forming the first yoke arm 30 receive N-pole magnetic flux from the permanent magnet 9, then the radially outer portions 32a of the plate-shaped pieces 32 forming the second yoke arm 31 receive S-pole magnetic flux. Conversely, when the radially outer portions 32a of the plate-shaped pieces 32 forming the first yoke arms 30 receive S-pole magnetic flux from the permanent magnet 9, then the radially outer portions 32a of the plate-shaped pieces 32 forming the second yoke arm 31 receive N-pole magnetic flux.

By virtue of the rotation of the permanent magnet 9 around the radially outer portions 32a of the plate-shaped pieces 32 forming the first and second yoke arms 30 and 31, the hub dynamo 1 repeatedly alternates between a first state in which the first yoke arms 30 comprise the N pole and the second yoke arms 31 comprise the S pole, and a second state in which the first yoke arms 30 comprise the S pole and the second yoke arms 31 comprise the N pole. As a result, alternating magnetic flux occurs in the radially inner portions 32b of the plate-shaped pieces 32 forming the yoke arms 30 and 31 that magnetically link both yoke arms 30 and 31. This also produces an alternating magnetic flux inside the coil 20, current flows through the coil 20, and power is generated. Because each yoke arm 30 and 31 comprises laminated plate-shaped pieces 32, the generation of eddy currents can be minimized in comparison with the conventional pressed sheet metal construction.

Figure 9:
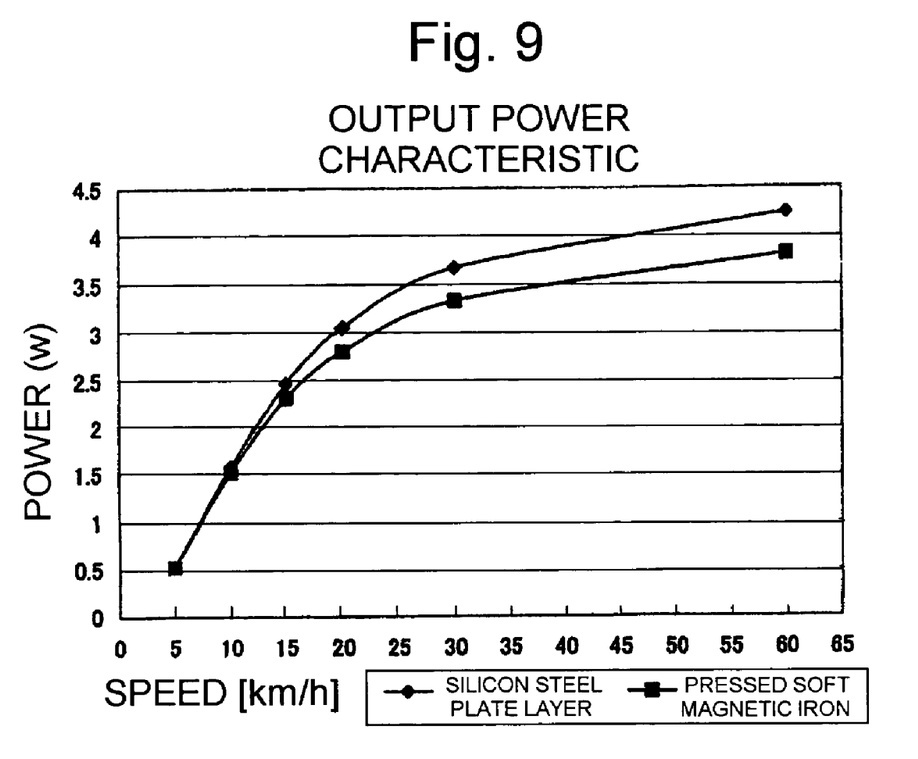
FIG. 9 is a graph of output power characteristics of a conventional dynamo and a dynamo constructed according to the teachings herein.
Figure 10:
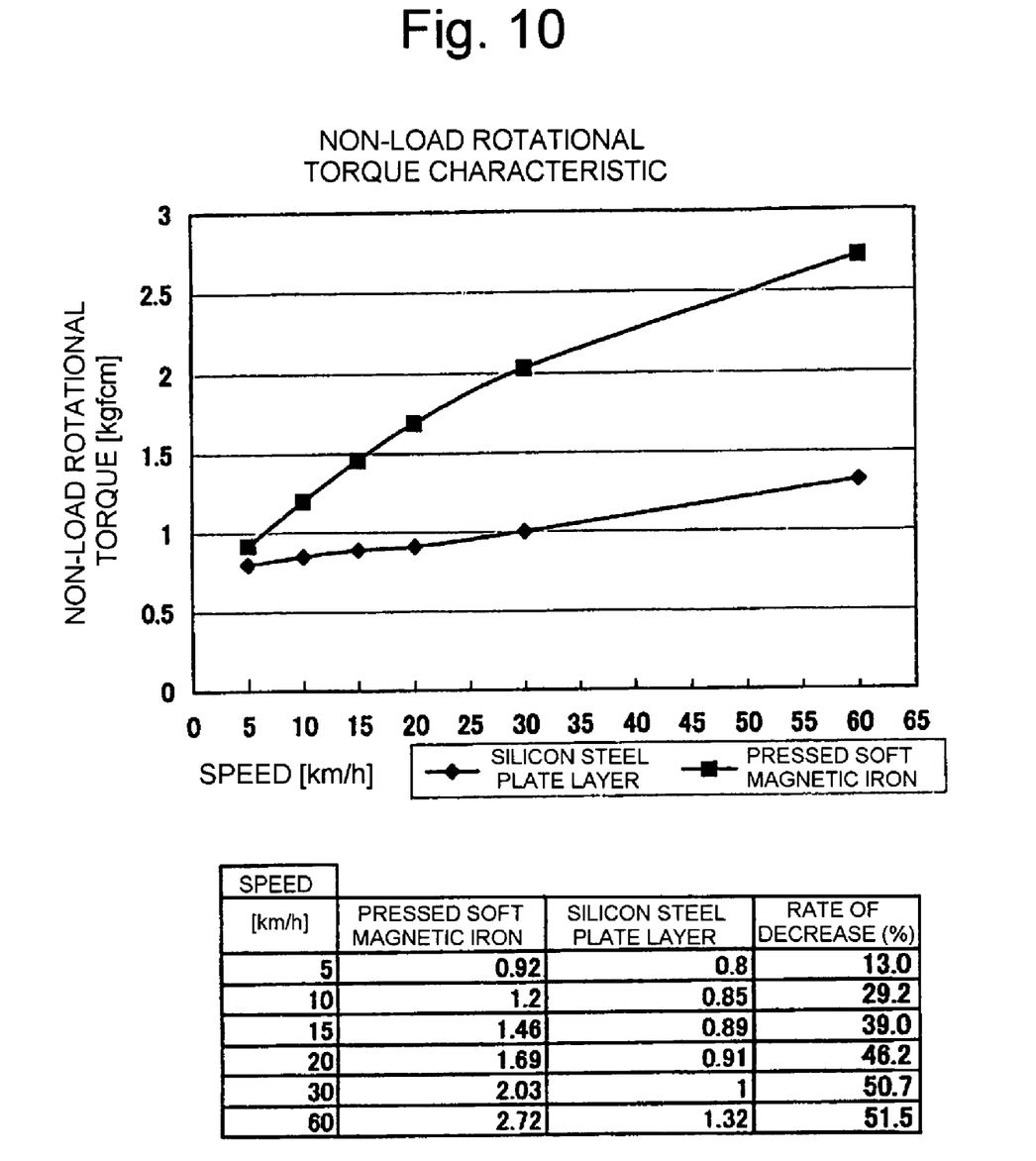
FIG. 10 is a graph of non-load rotational torque characteristics of a conventional dynamo and a dynamo constructed according to the teachings herein.

FIGS. 9 and 10 show the output power characteristic and the non-load rotational torque characteristic, respectively, for a conventional hub dynamo and a hub dynamo constructed according to the teachings herein. A press-formed yoke having the construction described in Japanese Patent Laid-Open No. 2000-0069731 was used as an example of a conventional hub dynamo, and soft magnetic iron was used as the material for the yoke. As an example of a hub dynamo constructed according to the teachings herein, laminated yoke arms formed from silicon steel plates were used. A ferrite magnet was used as the permanent magnet in both cases. In FIGS. 9 and 10, ♦ represents the hub constructed according to the teachings herein, while ■ represents the conventional hub dynamo. It should be clear from these experimental results that a hub dynamo constructed according to the teachings herein exhibits increased output power characteristics and non-load rotational torque characteristics as the bicycle speed increases.

While the above is a description of various embodiments of inventive features, further modifications may be employed without departing from the spirit and scope of the present invention. For example, in the above embodiment, plate-shaped pieces 32 in which the radially outer portion 32a, the radially inner portion 32b and the linking portion 32c were formed as a single unit were used, but the configuration of the plate-shaped pieces 32 is not limited to the above embodiment, and a construction may be used in which the radially outer portion, the radially inner portion and the linking portion are separate members. The use of this split plate-shaped piece construction enables the yield to be improved when the plate-shaped pieces are manufactured from silicon steel plates.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle claw-pole generator comprising:
a permanent magnet unit extending in a circumferential direction;
a coil disposed radially inwardly of the permanent magnet unit;
a yoke surrounding the coil, wherein the permanent magnet unit rotates relative to the yoke around an axis, wherein the yoke comprises:
a plurality of laminated first yoke arms disposed on a first axial side of the coil, each first yoke arm having a first yoke arm radially outer portion and a first yoke arm radially inner portion, and each first yoke arm comprising a plurality of circumferentially laminated first plate-shaped pieces;
a plurality of laminated second yoke arms disposed on a second axial side of the coil, each second yoke arm having a second yoke arm radially outer portion and a second yoke arm radially inner portion, and each second yoke arm comprising a plurality of circumferentially laminated second plate-shaped pieces;
wherein each first yoke arm radially inner portion faces a corresponding second yoke arm radially inner portion in the axial direction;
wherein the plurality of first yoke arm radially outer portions extend axially toward the second axial side of the coil;
wherein the plurality of second yoke arm radially outer portions extend axially toward the first axial side of the coil; and
wherein the plurality of first yoke arm radially outer portions are interleaved with the plurality of second yoke arm radially outer portions in a circumferential direction.

2. A claw-pole generator comprising:
a permanent magnet unit extending in a circumferential direction;
a coil disposed radially inwardly of the permanent magnet unit;
a yoke surrounding the coil, wherein the permanent magnet unit rotates relative to the yoke around an axis, wherein the yoke comprises:
a plurality of laminated first yoke arms disposed on a first axial side of the coil, each first yoke arm having a first yoke arm radially outer portion and a first yoke arm radially inner portion, and each first yoke arm comprising a plurality of laminated first plate-shaped pieces;
a plurality of laminated second yoke arms disposed on a second axial side of the coil, each second yoke arm having a second yoke arm radially outer portion and a second yoke arm radially inner portion, and each second yoke arm comprising a plurality of laminated second plate-shaped pieces;

wherein each first yoke arm radially inner portion faces a corresponding second yoke arm radially inner portion in the axial direction;

wherein the plurality of first yoke arm radially outer portions extend axially toward the second axial side of the coil;

wherein the plurality of second yoke arm radially outer portions extend axially toward the first axial side of the coil;

wherein the plurality of first yoke arm radially outer portions are interleaved with the plurality of second yoke arm radially outer portions in a circumferential direction; and a bobbin that has a tubular member that extends in the axial direction and first and second flanges that are disposed at opposite axial ends of the tubular member, wherein the coil is wound around the outer circumference of the tubular member.

3. The generator according to claim 2 wherein a plurality of grooves that extend radially and are arranged side-by-side are formed on a side surface of each of the first and second flanges of the bobbin along a circumferential direction, wherein a plurality of notches corresponding to the plurality of grooves are formed on radially outer portions of each of the first and second flanges, each first and second yoke arm having a linking portion that links its corresponding yoke arm radially outer portion and yoke arm radially inner portion, wherein the linking portion of each first yoke arm engages one of the plurality of grooves formed in the first flange, wherein a part of each first yoke arm engages with one of the plurality of notches formed in the first flange, wherein the linking portion of each second yoke arm engages one of the plurality of grooves formed in the second flange, and wherein a part of each second yoke arm engages with one of the plurality of notches formed in the second flange.

4. The generator according to claim 3 wherein a plurality of indentations are formed on radially outer portions of each of the first and second flanges of the bobbin so that the plurality of indentations formed on the first flange face the plurality of notches formed on the second flange, wherein distal ends of the plurality of first yoke arm radially outer portions are disposed in the indentations formed in the second flange, and wherein distal ends of the plurality of second yoke arm radially outer portions are disposed in the indentations formed in the first flange.

5. The generator according to claim 4 wherein the plate-shaped pieces comprising the first and second yoke arms are formed such that the radially outer portions of the first and second yoke arms are disposed on different radial lines than the radially inner portions of the first and second yoke arms when viewed in the axial direction.

6. A claw-pole generator comprising:
a permanent magnet unit extending in a circumferential direction;
a coil disposed radially inwardly of the permanent magnet unit;
a yoke surrounding the coil, wherein the permanent magnet unit rotates relative to the yoke around an axis, wherein the yoke comprises:
a plurality of first yoke arms disposed on a first axial side of the coil, each first yoke arm having a first yoke arm radially outer portion and a first yoke arm radially inner portion, and each first yoke arm comprising a plurality of first plate-shaped pieces;
a plurality of second yoke arms disposed on a second axial side of the coil, each second yoke arm having a second yoke arm radially outer portion and a second yoke arm radially inner portion, and each second yoke arm comprising a plurality of second plate-shaped pieces;
wherein each of the plurality of first yoke arms and the plurality of second yoke arms are circumferentially separate;
wherein each first plate-shaped piece comprises:
a first radially outer portion that extends from the first axial side toward the second axial side and is disposed between the permanent magnet unit and the coil; and
a first radially inner portion that is magnetically coupled to the first radially outer portion, wherein the first radially inner portion is disposed at the first axial side of the coil;
wherein each second plate-shaped piece comprises:
a second radially outer portion that extends from the second axial side toward the first axial side and is disposed between the permanent magnet unit and the coil; and
a second radially inner portion that is magnetically coupled to the second radially outer portion, wherein the second radially inner portion is disposed at the second axial side of the coil;
wherein each first yoke arm radially inner portion faces a corresponding second yoke arm radially inner portion in an axial direction, and wherein the plurality of first yoke arm radially outer portions are interleaved with the plurality of second yoke arm radially outer portions.

7. A claw-pole generator comprising:
a permanent magnet unit extending in a circumferential direction;
a coil disposed radially inwardly of the permanent magnet unit;
a yoke surrounding the coil, wherein the permanent magnet unit rotates relative to the yoke around an axis, wherein the yoke comprises:
a plurality of first yoke arms disposed on a first axial side of the coil, each first yoke arm having a first yoke arm radially outer portion and a first yoke arm radially inner portion, and each first yoke arm comprising a plurality of first plate-shaped pieces;
a plurality of second yoke arms disposed on a second axial side of the coil, each second yoke arm having a second yoke arm radially outer portion and a second yoke arm radially inner portion, and each second yoke arm comprising a plurality of second plate-shaped pieces;
wherein each first plate-shaped piece comprises:
a first radially outer portion that extends from the first axial side toward the second axial side and is disposed between the permanent magnet unit and the coil; and
a first radially inner portion that is magnetically coupled to the first radially outer portion, wherein the first radially inner portion is disposed at the first axial side of the coil;
wherein each second plate-shaped piece comprises:
a second radially outer portion that extends from the second axial side toward the first axial side and is disposed between the permanent magnet unit and the coil; and
a second radially inner portion that is magnetically coupled to the second radially outer portion, wherein the second radially inner portion is disposed at the second axial side of the coil;

wherein each first yoke arm radially inner portion faces a corresponding second yoke arm radially inner portion in an axial direction, and wherein the plurality of first yoke arm radially outer portions are interleaved with the plurality of second yoke arm radially outer portions;

a first flange disposed at the first axial side of the coil, wherein the first flange has a plurality of first radially inner groove portions and a plurality of first radially outer groove portions, wherein each first radially inner groove portion is associated with at least one of the plurality of first radially outer groove portions, wherein the plurality of first radially inner groove portions and the plurality of first radially outer groove portions are disposed circumferentially around the first flange, wherein each of the plurality of first radially inner groove portions receives therein the first radially inner portion of at least one of the plurality of first plate-shaped pieces of a corresponding one of the plurality of first yoke arms, and wherein each of the plurality of first radially outer groove portions receives therein a proximal portion of the first radially outer portion of at least one of the plurality of first plate-shaped pieces of a corresponding one of the plurality of first yoke arms; and a second flange disposed at the second axial side of the coil, wherein the second flange has a plurality of second radially inner groove portions and a plurality of second radially outer groove portions, wherein each second radially inner groove portion is associated with at least one of the plurality of second radially outer groove portions, wherein the plurality of second radially inner groove portions and the plurality of second radially outer groove portions are disposed circumferentially around the second flange, wherein each of the plurality of second radially inner groove portions receives therein the second radially inner portion of at least one of the plurality of second plate-shaped pieces of a corresponding one of the plurality of second yoke arms, and wherein each of the plurality of second radially outer groove portions receives therein a proximal portion of the second radially outer portion of at least one of the plurality of second plate-shaped pieces of a corresponding one of the plurality of second yoke arms therein.

8. The generator according to claim 7 wherein each of the plurality of first radially inner groove portions substantially face a corresponding one of the plurality of second radially inner groove portions when viewed in the axial direction.

9. The generator according to claim 7 wherein the plurality of first radially outer groove portions are circumferentially offset from the plurality of second radially outer groove portions when viewed in the axial direction.

10. The generator according to claim 9 further comprising:

a plurality of first indentations formed on the first flange, wherein each first indentation faces a corresponding second radially outer groove portion in the second flange;

a plurality of second indentations formed on the second flange, wherein each second indentation faces a corresponding first radially outer groove portion in the first flange;

wherein each first indentation receives therein a distal portion of the second radially outer portion of at least one of the plurality of second plate-shaped pieces of the second yoke arm disposed in the facing second radially outer groove portion; and wherein each second indentation receives therein a distal portion of the first radially outer portion of at least one of the plurality of first plate-shaped pieces of the first yoke arm disposed in the facing first radially outer groove portion.

11. The generator according to claim 9 wherein each of the plurality of first radially inner groove portions substantially face a corresponding one of the plurality of second radially inner groove portions when viewed in the axial direction.

12. The generator according to claim 11 further comprising:

a plurality of first indentations formed on the first flange, wherein each first indentation faces at least one of the plurality of second radially outer groove portions in the second flange;

a plurality of second indentations formed on the second flange, wherein each second indentation faces at least one of the plurality of first radially outer groove portions on the first flange;

wherein each first indentation receives therein a distal portion of the second radially outer portion of at least one of the plurality of second plate-shaped pieces of the second yoke arm disposed in the facing second radially outer groove portion; and wherein each second indentation receives therein a distal portion of the first radially outer portion of at least one of the plurality of first plate-shaped pieces of the first yoke arm disposed in the facing first radially outer groove portion.

13. The generator according to claim 12 further comprising:

a first notch disposed with each first radially outer groove portion of the first flange for receiving therein the proximal portion of the first radially outer portion of at least one of the plurality of first plate-shaped pieces of a corresponding one of the plurality of first yoke arms; and a second notch disposed with each second radially outer groove portion of the second flange for receiving therein the proximal portion of the second radially outer portion of at least one of the plurality of second plate-shaped pieces of a corresponding one of the plurality of second yoke arms.

14. The generator according to claim 11 wherein each first yoke arm further comprises a first linking arm connecting the first yoke arm radially outer portion and the first yoke arm radially inner portion, and wherein each second yoke arm further comprises a second linking arm connecting the second yoke arm radially outer portion and the second yoke arm radially inner portion.

15. The generator according to claim 14 wherein the first linking arm is inclined relative to the first yoke arm radially outer portion and the first yoke arm radially inner portion, and wherein the second linking arm is inclined relative to the second yoke arm radially outer portion and the second yoke arm radially inner portion.

16. The generator according to claim 15 wherein each first radially inner groove portion and its corresponding first radially outer groove portion form a continuous first groove, and wherein each second radially inner groove portion and its corresponding second radially outer groove portion form a continuous second groove.

17. The generator according to claim 16 further comprising a tubular member coupled to the first flange and to the second flange, wherein the coil is wound around the tubular member.

18. The generator according to claim 17 further comprising:
   a plurality of first indentations formed on the first flange, wherein each first indentation faces at least one of the plurality of second radially outer groove portions in the second flange;
   a plurality of second indentations formed on the second flange, wherein each second indentation faces at least one of the plurality of first radially outer groove portions on the first flange;
   wherein each first indentation receives a distal portion of the second radially outer portion of at least one of the plurality of second plate-shaped pieces of the second yoke arm disposed in the facing second radially outer groove portion; and
   wherein each second indentation receives a distal portion of the first radially outer portion of at least one of the plurality of first plate-shaped pieces of the first yoke arm disposed in the facing first radially outer groove portion.

19. The generator according to claim 18 further comprising:
   a first notch disposed with each first radially outer groove portion of the first flange for receiving therein the proximal portion of the first radially outer portion of at least one of the plurality of first plate-shaped pieces of a corresponding one of the plurality of first yoke arms; and
   a second notch disposed with each second radially outer groove portion of the second flange for receiving therein the proximal portion of the second radially outer portion of at least one of the plurality of second plate-shaped pieces of a corresponding one of the plurality of second yoke arms.

20. The generator according to claim 19 wherein each of the plurality of first plate-shaped pieces comprises a laminated first plate-shaped piece, and wherein each of the plurality of second plate-shaped pieces comprise a laminated second plate-shaped piece.

21. A bicycle hub dynamo that is disposed in the center of a bicycle wheel, wherein the dynamo comprises:
   a hub shaft for mounting to a frame of the bicycle;
   a casing having a cylindrical case main unit that extends along an axis of the hub shaft and a pair of hub flanges disposed at opposite ends of the case main unit;
   a pair of bearings that rotatably support the case main unit on the hub shaft;
   an annular permanent magnet disposed on an inner circumferential surface of the case main unit;
   an interior fixed unit disposed radially inwardly of the permanent magnet and fixed relative to the hub shaft;
   an annular coil disposed radially inwardly of the permanent magnet and wrapped around the interior fixed unit;
   a yoke surrounding the coil, wherein the permanent magnet unit rotates relative to the yoke around an axis, wherein the yoke comprises:
      a plurality of circumferentially laminated first yoke arms disposed on a first axial side of the coil, wherein each first yoke arm has a first yoke arm radially outer portion, a first yoke arm radially inner portion, and a first yoke arm linking portion connecting the first yoke arm radially outer portion and the first yoke arm radially inner portion, and wherein each first yoke arm comprises a plurality of laminated first plate-shaped pieces;
      a plurality of circumferentially laminated second yoke arms disposed on a second axial side of the coil, wherein each second yoke arm has a second yoke arm radially outer portion, a second yoke arm radially inner portion, and a second yoke arm linking portion connecting the second yoke arm radially outer portion and the second yoke arm radially inner portion, and wherein each second yoke arm comprises a plurality of laminated second plate-shaped pieces;
   wherein each first plate-shaped piece comprises:
      a first radially outer portion that extends from the first axial side toward the second axial side and is disposed between the permanent magnet unit and the coil; and
      a first radially inner portion that is connected to the first radially outer portion through a first linking portion, wherein the first radially inner portion is disposed at the first axial side of the coil;
   wherein each second plate-shaped piece comprises:
      a second radially outer portion that extends from the second axial side toward the first axial side and is disposed between the permanent magnet unit and the coil; and
      a second radially inner portion that is connected to the second radially outer portion through a second linking portion, wherein the second radially inner portion is disposed at the second axial side of the coil;
   wherein each first yoke arm radially inner portion faces a corresponding second yoke arm radially inner portion in an axial direction, and wherein the plurality of first yoke arm radially outer portions are interleaved with the plurality of second yoke arm radially outer portions in a circumferential direction.

* * * * *